Nov. 19, 1963    M. J. MARTIN    3,111,487
SUCTION FILTERS
Filed Nov. 25, 1960    2 Sheets-Sheet 1

INVENTOR
MICHAEL JAMES MARTIN
By Irwin S. Thompson
ATTY.

INVENTOR
MICHAEL JAMES MARTIN 3,111,487
SUCTION FILTERS
Michael James Martin, Springvale, Victoria, Australia, assignor to Filtration & Water Softening Proprietary Limited, Springvale, Victoria, Australia, a company of Victoria
Filed Nov. 25, 1960, Ser. No. 71,533
3 Claims. (Cl. 210—136)

This invention relates to filters of the kind generally known as suction or vacuum filters, wherein the requisite pressure differential across a filter medium is produced by a pump connected to the filtrate discharge side thereof.

The general object of this invention is to provide improved suction filters wherein the filter beds thereof may be cleansed by a reverse flow of filtered water at a suitably high velocity.

Accordingly, the invention includes a suction filter comprising a plurality of filter chambers, each provided with or adapted to contain a filter bed, means for supplying liquid to each chamber above the bed therein, a suction pump common to the several chambers for withdrawing filtered water from the lower ends thereof and valve means operable to cause each filter bed to be backwashed in turn by the combined flow of filtered liquid from the remaining chambers.

More particularly, the lower or discharge end of each filter chamber is normally connected to the inlet port of the pump, but may alternatively be connected by the said valve means to the delivery port thereof.

According to the preferred form of the invention, the several filter beds are successively backwashed by means of a common control valve comprising a casing having a valve seat at one end of a chamber therein and provided with a plurality of radially arranged ports, each port being connected to the filtrate discharge outlet of a corresponding filter chamber, the interior of the valve chamber being connected to the inlet port of the pump and an angularly movable valve member operable to connect each port in turn to the discharge side of the pump.

More particularly, the valve seat is preferably formed with an axial passage which connects with the pump delivery pipe and the angularly movable valve member is preferably formed with a radial passage which communicates at its inner end with the said axial passage, while its outer end may be moved into register with any one of the said ports in the valve seat.

Alternatively, the axial discharge passage may be arranged at the opposite end of the valve chamber.

A filter according to the invention may also include power-actuated means for operating the valve member, and means responsive to the pressure drop across the filter beds to turn the said valve member either continuously or intermittently through one complete revolution, thereby to cause the several filter beds to be backwashed in turn when the pressure drop rises to a predetermined value. Alternatively, the valve actuating means may be controlled by timing mechanism whereby the filter beds are backwashed automatically at predetermined time intervals.

The invention is hereinafter further described, with reference to the accompanying drawings in which.

Figure 1:
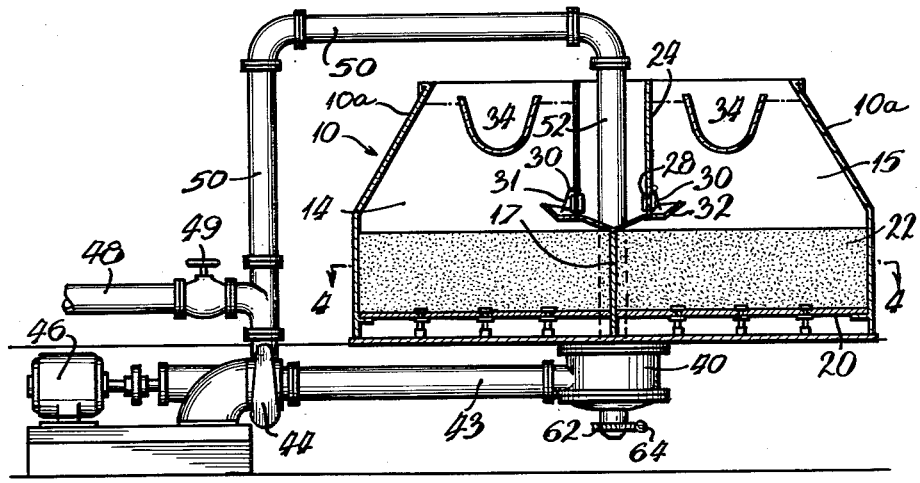
FIGURE 1 is a view in sectional elevation of a four-cell suction filter according to the invention.
Figure 2:
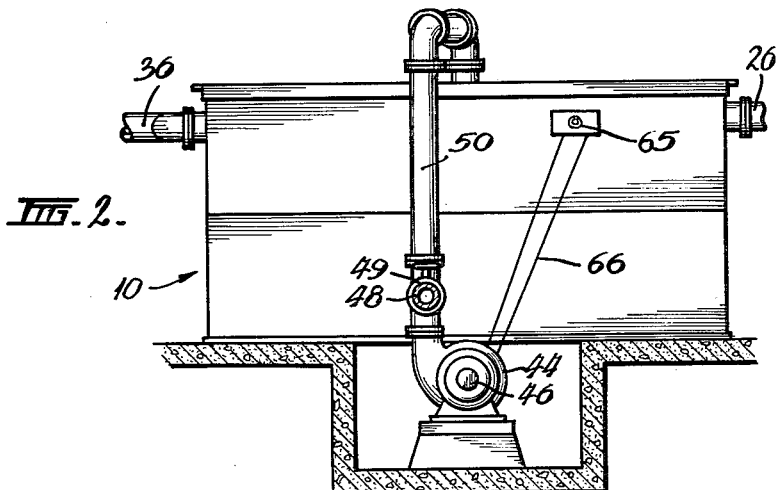
FIGURE 2 is a view in side elevation of the filter.
Figure 5:
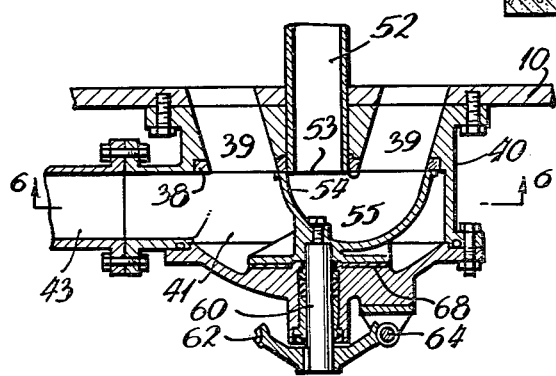
FIGURE 5 is a view in sectional elevation of a control valve in the filter and is drawn to a larger scale.
Figure 3:
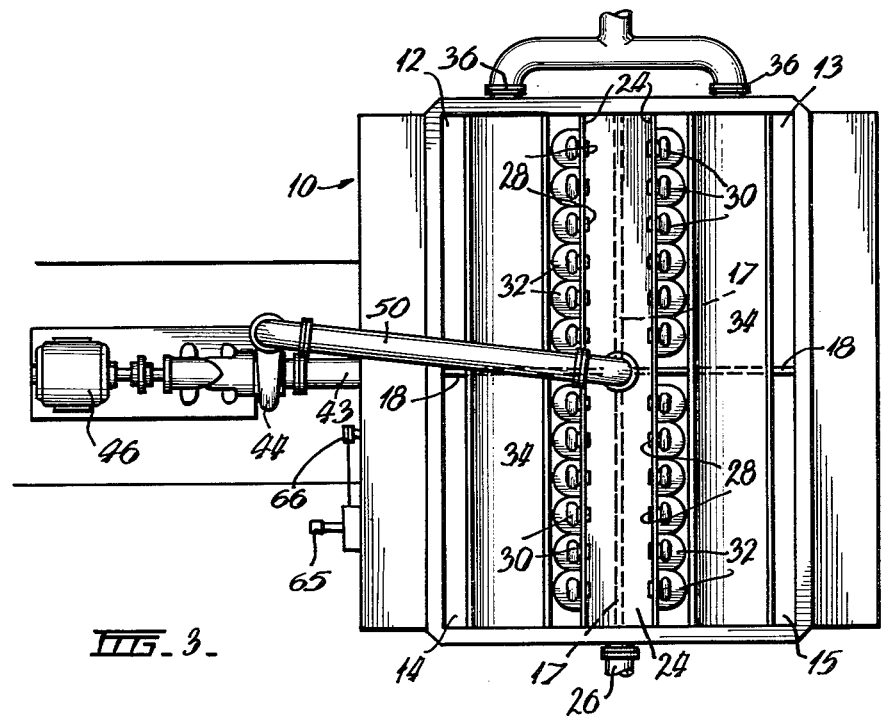
FIGURE 3 is a view in plan.
Figure 4:
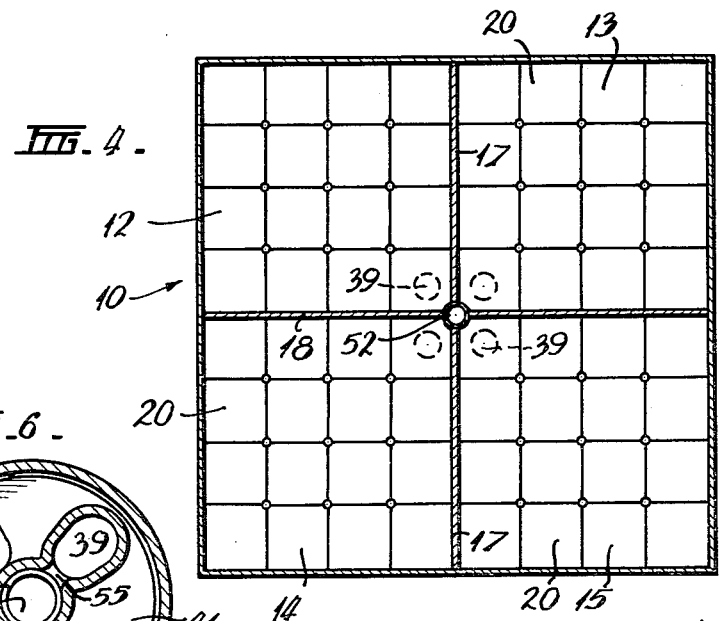
FIGURE 4 is a view in sectional plan taken on the line 4—4 of FIGURE 1.
Figure 6:
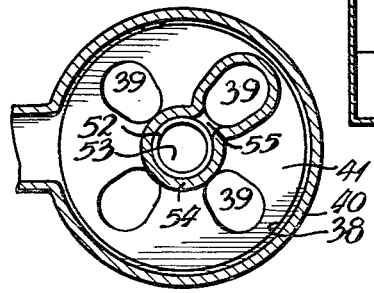
FIGURE 6 is a view in inverted sectional plan taken on the line 6—6 of FIGURE 5.

The suction filter shown in the drawings comprises a casing 10 of square shape in plan which is sub-divided into four filter chambers 12, 13, 14 and 15 by two internal vertical partition walls 17 and 18 arranged at right angles parallel to the respective outer walls of the casing which is open at the top, but which is preferably normally covered by a removable cover (not shown).

A transversely extending plate 20 is arranged a short distance above the bottom of each filter chamber to support a filter bed 22 formed of suitable granular material, the said plates being either perforated and covered on their upper surfaces with wire gauze or formed of porous tiles or otherwise being adapted to support the granular material, while permitting water to pass therethrough.

The filter beds may for example consist of silica sand, but preferably they are formed of or contain granular calcium silicate as disclosed in the specification of patent application No. 851,547, and now abandoned.

A deep and narrow supply channel 24 for the water to be filtered is arranged transversely within the upper part of the interior of the casing 10 and midway between two opposite sides of the latter. This channel is thus arranged directly above the partition wall 17 and is welded to the corresponding side walls of the casing and water is supplied to the channel through an inlet pipe 26 which projects from one of the last-mentioned walls.

Each of the two opposite sides of the channel is provided near the bottom of the latter with a plurality of spaced openings 28 for the discharge of the water into the filter chambers a short distance above the surfaces of the filter beds therein and each of these openings is provided with a non-return valve 30 to prevent the passage of water from the respective filter chamber to the channel.

Preferably and as shown, each of these valves 30 comprises a flap which is hinged at its upper end and which coacts with an upwardly and inwardly inclined seating member 31 secured to the channel wall.

In order to prevent scouring of the surfaces of the filter beds by the incoming water, an inclined baffle or deflector 32 is arranged below each discharge opening 28 and above the respective filter beds.

In use, the inlet pipe 26 is connected to a swimming pool or other source of liquid to be filtered and in which a substantially constant level is maintained by a float valve or otherwise and the normal level of liquid in the channel 24 and in each chamber is substantially the same as that of the source thereof.

Alternatively, the water may enter each filter chamber through a float-controlled valve (not shown) which normally maintains the required level therein.

An overflow collecting trough or launder 34 is arranged horizontally at each side of and parallel to the central channel 24 so as to extend above the respective pair of filter beds and the upper edges thereof are disposed close to, but somewhat below the top of the casing 10 and of the supply channel 24. One end of each launder is provided with a wash water discharge opening 36 formed in the respective side wall of the casing and through which the wash water is discharged to waste.

When a filter bed is backwashed by a reverse flow of filtered water, the level of the water in the chamber rises until it overflows into the respective launder, it being understood that the respective flap valves 30 automatically close to prevent the passage of liquid from the respective chamber into the central supply channel 24. Similarly, if a float valve is used instead of nonreturn valves, it automatically shuts off the inflow of water above the bed when the water level rises in the respective chamber during the backwashing thereof.

A control valve arranged centrally below the filter has a casing 40 with an internal chamber 41. The top of this chamber forms a valve seat 38 provided with four angularly spaced ports arranged at equal distances from the vertical axis of the chamber and constituted by the lower ends of corresponding passages 39. These passages 39 communicate at their upper ends with the adjacent inner corners of the respective filter chambers below the filter beds therein. The valve chamber has a lateral discharge passage communicating by a pipe 43 with the inlet port of a centrifugal pump 44 which is direct coupled to an electric driving motor 46.

The outlet port of the pump is connected to a filtrate delivery pipe 48 fitted with a shut-off valve 49, while a further pipe 50 from the pump outlet port connects with the upper end of a vertical pipe 52 extending centrally through the filter casing and communicating with a central port 53 in the valve seat 38.

The central port 53 is covered at all times by the inner end of a radial valve member 54 which engages the valve seat and which is formed with a passage 55 having both of its ends open. Thus, by turning the valve member about the axis of the central port 53, the outer end of the passage 55 therein may be caused to register in turn with the passages 39 leading to the lower ends of the several filter chambers, whereby the latter are successively connected through the central port 53 to the pipe 52.

During normal filtration, the valve member is arranged so that its outer end is located midway between two of the ports 39 and in these circumstances, the valve chamber 41 serves merely to collect the filtered water passing from the several filter chambers to the pump which returns the water to the pool or the like. As the upper end of the casing 10 is disposed above the level in the pool, the water rises only to approximately the same level in the pipe 50 and so does not pass into the central pipe 52.

When however, the shut-off valve 49 is closed and the valve member 54 is turned so that the port in its outer end communicates with one of the radially arranged ports 39 in the valve seat, the combined flow of filtered water from three of the filter chambers is directed by the pipes 50 and 52 and the valve member 54 into the bottom of the remaining chamber so as to subject the bed therein to a backwashing operation at a velocity which is approximately equal to three times the normal rate of flow during filtration.

The bed is thus hydraulically suspended and when the level of the wash water rises to the top of the respective launder 34, it overflows into the latter and is discharged to waste.

In order to increase the velocity of the water in the upper portions of the filter chambers to facilitate the removal of foreign matter and impart a more effective scouring action to the suspended granular material, the cross-sectional area thereof is reduced by forming the upper portions of two opposite walls of the casing so that they incline inwardly and upwardly as shown at 10a in FIGURE 1.

Thus by turning the valve member 54 through one complete revolution, each of the filter beds is backwashed in turn by the combined flow of filtered water from the remaining three filter chambers. As the valve member is being moved out of register with each of the radial ports, the upward flow of wash water is gradually reduced so that the suspended filter bed is hydraulically regraded.

The valve member is operated as described by a spindle 60 which is connected thereto and which projects from the bottom of the chamber and any suitable means may be provided for actuating the spindle either manually or automatically. In the illustrated construction, the projecting lower end of the spindle is fitted with a worm gear 62 in mesh with a worm on a spindle 64 which is arranged to be operated by a hand-crank 65 through a chain drive 66. If desired, the valve driving mechanism may incorporate ratchet or other means to cause the valve member to pause in register with each of the radial ports.

It will be apparent that the backwashing operation may be carried out, entirely automatically, by providing suitable pressure responsive means to actuate a starting switch when the pressure at the inlet to the pump falls to a predetermined value, due to the partial clogging of the filter beds. When the said switch is operated, the valve is automatically turned through, say, one and a quarter complete revolutions, in order that the first chamber will be washed twice. When the valve completes its movement, the driving motor is automatically switched off and it will be understood that normally the said valve member is arranged between and is clear of an adjacent pair of ports.

As the pressure of the water passing through the valve member 54 during each backwashing operation, tends to force this member from the valve seat, a nylon or other thrust bearing ring 68 of considerable area is provided to maintain it substantially in contact therewith. It will be apparent however that a small amount of leakage is not important, as any leakage water is merely re-circulated.

I claim:

1. A suction filter comprising a plurality of filter chambers, a filter bed of granular material in each filter chamber, means for supplying liquid to each chamber above the level of the bed therein, means for the discharge of wash liquid from an upper portion of each filter chamber, a wash water control valve common to the several chambers, the said valve being connected to the lower end portion of each filter chamber by a corresponding filtrate discharge passage, a suction pump having its inlet port connected to the said valve, a pipe connected to the delivery port of the pump for the discharge of filtered liquid to service, a wash liquid supply pipe connecting said delivery port of the pump to the said valve, an angularly movable member mounted in said valve, means connecting the angularly movable member to the wash liquid supply pipe, said angularly movable member being selectively moved to one position whereby all the filtrate discharge passages are simultaneously connected to the pump inlet port and said angularly movable member being selectively moved to a second position which includes connecting any one of said filtrate discharge passages to said wash liquid supply pipe while the remaining filtrate discharge passages remain connected to the pump inlet port whereby each filter chamber can be backwashed in turn with filtrate discharged from the remaining filter chambers, and means connected to said angularly movable member to move same to the one and the second positions as desired.

2. A suction filter comprising a plurality of filter chambers, each adapted to contain a filter bed of granular material, means forminng at least one supply channel for the liquid to be filtered, the said channel being arranged to discharge the liquid into the several filter chambers through corresponding discharge openings disposed below the normal level of the liquid therein and above the normal level of the filter beds, non-return valve means arranged to prevent the return flow of liquid from each filter chamber to the said channel, means for the discharge of wash liquid from an upper portion of each filter chamber, a common wash water control valve for the several filter chambers, said valve having a chamber therein provided with a plurality of ports, an angularly movable radial valve member within said chamber, said valve member having therein a radial passage which is open at its inner and outer ends, means for actuating the said valve member to cause the outer end of the said passage to register with any one of said plurality of ports in said valve chamber, a filtrate discharge passage connecting each of the said plurality of ports to the lower end portion of a corresponding one of the filter chambers, a suction pump, a suction pipe connecting the said valve chamber to the intake of the pump, a delivery pipe for said pump to deliver filtered liquid to service, and means forming a passage connecting the delivery pipe to the inner end of said passage in the radial valve member, the said valve member being normally arranged in a position such that its outer end is disposed out of register with all of the said ports whereby the lower ends of the several filter chambers are simultaneously connected to the intake of the pump.

3. A suction filter comprising a plurality of filter chambers, each adapted to contain a filter bed of granular material, means for supplying liquid to each chamber above the normal level of the bed and below the normal level of the liquid therein, overflow means for the discharge of wash liquid from an upper portion of each filter chamber, a common wash water control valve arranged below the several chambers, the said control valve comprising a casing having a chamber therein, a valve seat forming the upper end of the said chamber, the said valve seat being formed with a central port and with a plurality of angularly spaced ports arranged at equal distances from the said central port, each of said plurality of angularly spaced ports communicating with a corresponding filter chamber, a radial valve member arranged within the valve chamber, means maintaining the valve member in substantial engagement with the said valve seat, the said valve member being formed with a radial passage which is open at its inner and outer ends, the said inner end of the radial passage being in constant register with the central port in the valve seat, means operable to turn the said radial valve member about an axis passing through the central port thereby to cause the outer end of said radial passage therein to register with any selected one of the said angularly spaced ports in the valve seat, a suction pump having its inlet port communicating with the valve chamber, a delivery pipe for said pump and a wash water supply pipe connecting said central port in the valve seat to the pump delivery pipe and wherein said wash water supply pipe extends upwardly from the control valve to a position above the normal level of the liquid in the said filter chambers.

References Cited in the file of this patent

UNITED STATES PATENTS

| 538,720 | Allen | May 7, 1895 |
| 2,199,891 | Martin | May 7, 1940 |
| 2,806,486 | McDonald et al. | Sept. 17, 1957 |
| 2,970,696 | Mummert | Feb. 7, 1961 |

FOREIGN PATENTS

| 19,220 | Great Britain | 1890 |